Feb. 11, 1958     H. J. BICHSEL ET AL     2,823,331
ARC WELDING APPARATUS

Filed Oct. 29, 1954                                                       2 Sheets-Sheet 2

WITNESSES
Robert C. Baird
Leon M. Garman

INVENTORS
Harry J. Bichsel
and Alfred J. Baeslack
BY
Hymen Diamond
ATTORNEY

United States Patent Office 2,823,331
Patented Feb. 11, 1958

2,823,331

ARC WELDING APPARATUS

Harry J. Bichsel, East Aurora, and Alfred J. Baeslack, Buffalo, N. Y., assignors to Westinghouse Electric Corporation, East Pittsburgh, Pa., a corporation of Pennsylvania Application October 29, 1954, Serial No. 465,600

13 Claims. (Cl. 314—70)

Our invention relates to arc welding apparatus, and has particular relation to a control system for automatic or semi-automatic arc welding apparatus with a consumable electrode in a shield of inert gas.

Apparatus of this type usually includes a power supply unit, a welding gun through which a consumable welding electrode connected to the supply is passed, a motor for driving the electrode, and a control circuit for the motor. Difficulty is often encountered in using prior art apparatus of this type, particularly during and at the end of a weld. At the end of a weld when the operation is being stopped, the electrode has a tendency to freeze to the weld or to run out of the gas shield so that the electrode must be trimmed before another weld is started. To an extent, the freezing or running out may be suppressed by braking the motor which drives the electrode at the end of a weld. But the braking introduces additional problems since it affects the starting or stopping of the motor. At the beginning of a weld when the operation is being started, the electrode has a tendency to be burned back into the gun if the brake delays the starting of the motor. This burning results in damage to the electrode guide and other parts of the gun. At the end of a weld, burn back may also occur if the braking is applied prematurely or is excessive.

It is, accordingly, a broad object of our invention to provide arc welding apparatus in which the burning back of the electrode at the beginning, during and at the end of a weld, and the freezing of an electrode to the weld or its running out at the end of a weld, shall be suppressed.

Our invention in its broader aspects arises from the realization that the burning back and the freezing of the electrode in welding with prior art apparatus arises from improper coordination of the feeding of the welding electrode with the firing and extinction of the welding arc. If the electrode is fed at too low a speed at the start of a welding operation, the arc necessarily tends to burn the electrode back. If at the end of a welding operation the electrode is stopped an appreciable time interval before the arc is extinguished, the arc again tends to burn back the electrode. On the other hand, if the electrode continues to be fed after the arc is extinguished, the electrode impinges on the welded metal which is solidifying and adheres to it.

In accordance with our invention, we provide facilities for properly coordinating the firing and extinction of the arc with the feed of the welding electrode. In accordance with the specific aspects of our invention, the motor which feeds the electrode is provided with a braking circuit which is closed in the stand-by condition of the apparatus. In addition, the motor is provided with a supply circuit capable of imparting to the motor a high acceleration. During the starting of a welding operation, the braking circuit is first opened and thereafter the supply circuit to the welder is energized and the arc is fired. The acceleration of the motor is such that during starting, the electrode is continually supplied and the burn-back does not occur. When the welding is to be stopped, the supply circuit to the welder is opened first and thereafter the braking circuit for the motor is closed. The braking circuit has such parameters that the motor is brought to rest and the arc is extinguished substantially simultaneously and burn-back and freezing are in this case both avoided.

Our arc welding apparatus usually includes as a component of the combination a power supply unit as disclosed in application Serial No. 429,932, filed May 14, 1954, to Harry J. Bischsel (hereinafter called Bichsel application). When such a power supply unit is included, it is essential that the speed of the welding electrode and, therefore, the welding current, which is determined by the rate at which the electrode is fed to the work, be precisely controlled.

It is a more specific object of our invention to provide arc welding apparatus having facilities for precise control of the speed of the welding electrode.

It is an ancillary object of our invention to provide a control circuit capable of precise operation for the motor which drives the welding electrode.

It is a general object of our invention to provide a novel electronic circuit for controlling a motor.

In accordance with this aspect of our invention, the electrode feed motor is provided with a control circuit which includes only one electric discharge device, preferably a thyratron, the anode and cathode of which are connected in series with the armature of the motor, the primary of a transformer and the terminals of an alternating current power supply. The control circuit of the motor includes a phase shifting device capable of delivering a potential displaced in phase by an angle of the order of 90° with respect to the alternating potential and a direct current potential derivable from the secondary of the transformer, which is itself dependent on the current transmitted through the armature. The armature, in addition to being connected in the anode-cathode circuit of the discharge device, is also connected in the control circuit in series with the direct current potential and the phase shifted potential. And, in addition, a direct current biasing potential for setting the firing instant of the thyratron at a desired intermediate magnitude is included. This latter setting is effected by a variable resistor, which is mounted in the welding gun so that it is readily operable by the operator holding the gun, and is connected by conductors passing through the gun in the control circuit of the thyratron.

The conductivity of the discharge device in this circuit, and thus the speed of the motor, may be varied over a moderate range. The motor may be readily and precisely set to operate anywhere in the range by setting the biasing potential. The direct current potential derived from the transformer operates to compensate for the potential drop across the resistance of the motor, that is, for the IR drop of the motor.

An additional feature of our invention arises from our discovery that in prior art apparatus difficulty is encountered from kinking of the electrode or from excessive bending or flexing of the flexible conduit through which the electrode flows to the gun. A kinked electrode in passing through the gun is impeded or stopped by the electrode guide tube and when this happens, there is burn-back of the electrode and damage to the gun. A similar condition occurs if the flexible conduit is excessively bent. In addition, we have found that the heating of the electrode guide tube during a welding operation tends to cause it to bind on the electrode and to impede the electrode motion with consequent burn-back.

It is then an additional object of our invention to provide apparatus for welding continuously with a consumable electrode in which the impeding of the movement of the electrode by reason of kinking or excessive bending of the flexible conduit or by reason of heating of the electrode guide tube shall be suppressed.

In accordance with this aspect of our invention, the electrode is advanced by two rollers having grooves of semicircular section into which the electrode fits and both of which rollers are driven. This positive drive overcomes the effects of kinking, excessive bending of the guide or of the heating of the guide tube. The motor draws additional current when the above-described obstructions arise, but this additional current does not produce any reduction in motor and electrode speed because of the IR drop compensation of the motor control circuit.

The novel features that we consider characteristic of our invention are set forth generally above. The invention itself both as to its organization and its method of operation, together with additional objects and advantages thereof, will be better understood from the following description taken in connection with the accompanying drawing, in which Figure 1 is a circuit diagram of welding apparatus in accordance with our invention;

Figure 1:
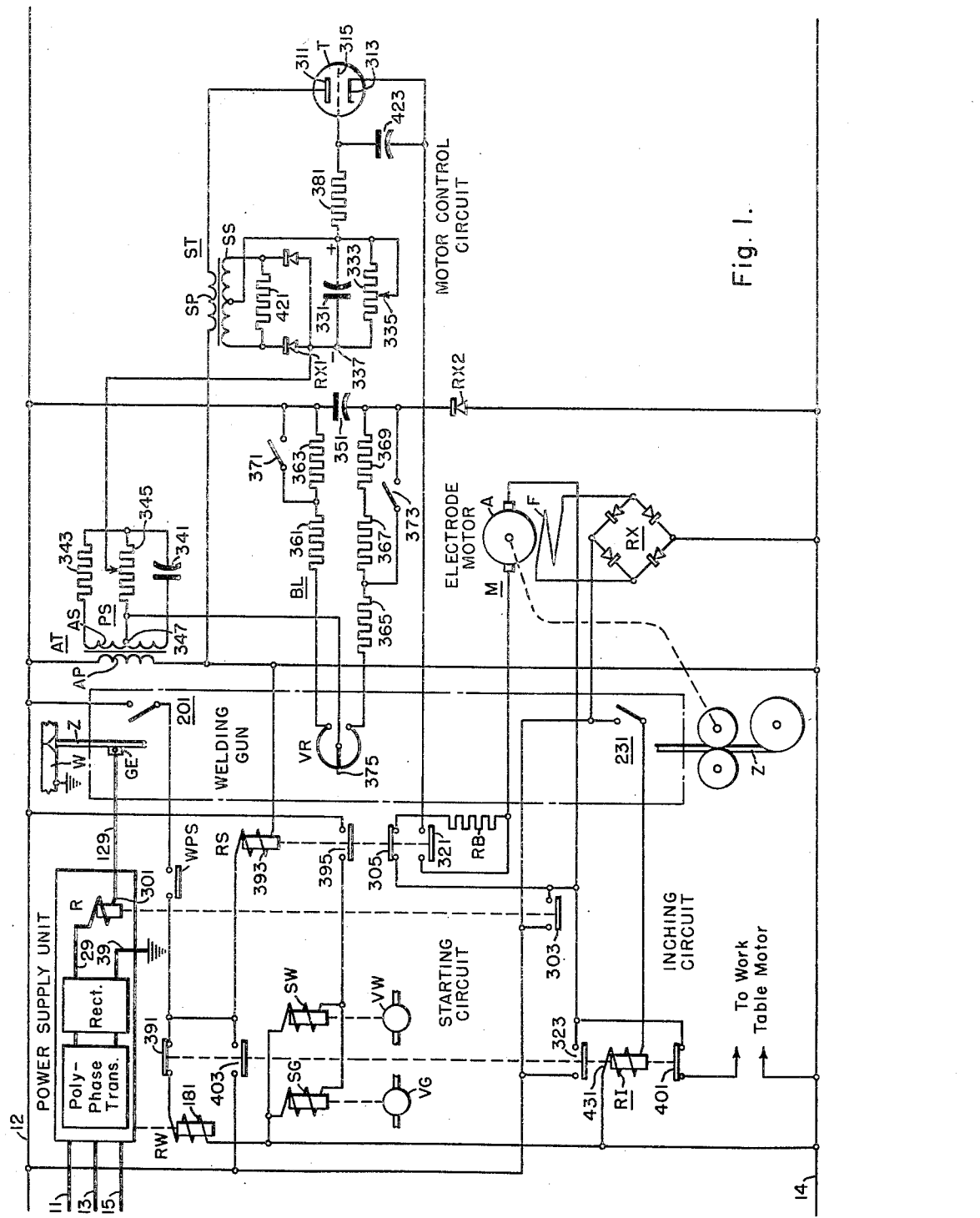
Figure 2:
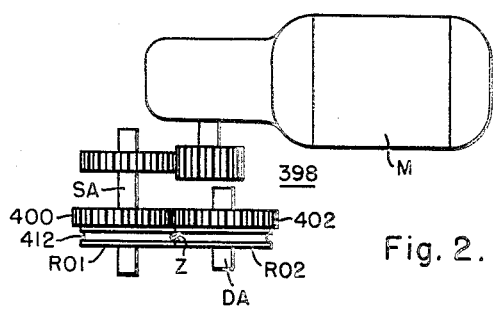
Fig. 2 is a view in elevation showing the drive motor for the electrode and its associated components.
Figure 3:
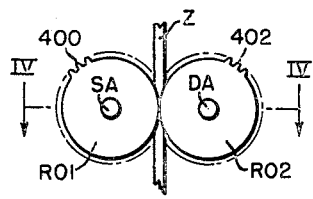
Fig. 3 is a view in end elevation showing the double roller electrode drive in accordance with our invention.
Figure 4:
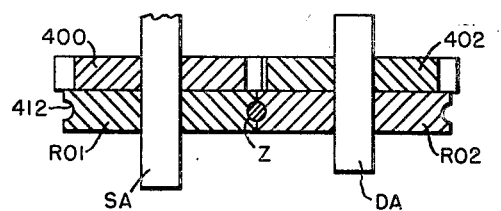
Fig. 4 is a view in section taken along IV—IV of Fig. 3.

The apparatus shown in the drawing includes a Power Supply Unit, a Welding Gun, an Electrode Motor, a Motor Control Circuit, a Starting Circuit, and an Inching Circuit. The Power Supply Unit may be supplied from the buses or conductors 11, 13 and 15 of a commercial polyphase power supply. The other components may be supplied from buses or conductors 12 and 14 which may also derive their power from the buses of a commercial supply.

The Power Supply Unit may be of any type but, in accordance with the preferred practice of our invention, is of the type disclosed in the Bichsel application. The specific structure of the Power Supply Unit does not concern this invention and is not presented here in detail. Reference is made to the Bichsel application for any details of the structure, and for this purpose the Bichsel application is incorporated herein by reference. The principal components of the Power Supply Unit of interest in the description of this invention are a welding transformer labeled Polyphase Transformer and a so-labeled Rectifier. The Rectifier has a pair of output terminals 29 and 39 which are connected to the electrode Z and the work W, the former including at one point a one turn coil 301 which operates as the coil of a current relay R having a single normally opened contact 303.

The Welding Gun is preferably, but not necessarily, of the type disclosed in an application Serial No. 465,508, filed October 29, 1954, to Joseph F. Miller and assigned to Westinghouse Electric Corporation (hereinafter called Miller application), which is incorporated herein by reference. The principal components of this gun which ties the gun in as an element of the combination disclosed in this application are an electrode guide GE through which the electrode Z is driven to the work W, a start switch 201, an inch switch 231 and a variable resistor VR. The electrode guide GE is connected to the conductor 129 specifically as disclosed in the Miller application, the connection being represented symbolically in the drawing.

The Electrode Motor M is a D.-C. motor of fractional horsepower particularly suitable for electronic control. Specifically, a $\frac{1}{12}$ horsepower motor sold by Bodine Electric Company of Chicago, Illinois, under the identification NSH-53R. This motor includes an armature A having skewed slots and a field F. The field F is supplied with direct current from the conductors 12 and 14 through a rectifier RX. The armature A is supplied from the Motor Control Circuit.

The drive shaft (not shown) of the motor is connected through a reduction gear assembly 398 to an output shaft SA which is geared by means of one-to-one gears 400 and 402 to a second shaft DA. Each of the shafts SA and DA carry rollers RO1 and RO2 for driving the electrode Z. Each of the rollers has a central peripheral groove 412 of semicircular cross section into which the electrode Z fits. While a semicircular section groove is preferred, other forms may be used in accordance with the broader aspects of our invention. Thus, the rollers RO1 and RO2 may be knurled or the section of the groove may be V-shaped.

The Electrode Motor is provided with a braking circuit. Specifically, this circuit includes a resistor RB which in the stand-by condition of the apparatus is connected in parallel with the armature A through the normally closed contacts 305 of a starting relay RS.

The Motor Control Circuit includes a thyratron T having an anode 311, a cathode 313 and a control electrode 315. This Motor Control Circuit also includes a transformer ST having a primary SP and a secondary SS, the latter having an intermediate terminal. The primary SP, the anode and cathode of the thyratron T and the armature A are adapted to be connected in a series circuit extending from the conductor 14, through the primary SP, the anode 311 and cathode 313 of the thyratron T, a normally open contact 321 of the starting relay RS, the armature A, and, alternatively, through the normally open contact 303 of the relay R or the normally open contact 323 of an inching relay RI, to the conductor 12.

The secondary SS of the transformer ST is connected through a rectifier RX1 across a smoothing capacitor 331 shunted by a variable resistor 333. A direct current potential is thus derivable between the adjustable arm 335 and one terminal 337 of the resistor 333.

The thyratron has a control circuit including a resistor 333 supplied from the secondary SS, a phase shifting unit PS, a biasing unit BL and the armature A. The phase shifting unit PS includes a transformer AT, having a primary AP connected between the conductors 12 and 14, and an intermediate tapped secondary AS. Between the terminals of the secondary AS, a capacitor 341 and a resistor 343 are connected in series. A variable resistor 345 is connected between the junction of the capacitor 341 and resistor 343 and the intermediate tap 347. The biasing unit BL includes a capacitor 351 connected between the conductors 12 and 14 through a rectifier RX2. Across the capacitor, the terminals of the variable resistor VR are connected through a plurality of resistors, 361 and 363 on one side and 365, 367 and 369 on the other, certain of which, 363 and 367 and 369, may be shunted out by switches 371 and 373 respectively, across the capacitor 351.

The control electrode 315 and cathode 313 of the thyratron T are connected in a series circuit extending from the control electrode through a grid resistor 381, to the adjustable tap 335 of the variable resistor 333 to the negative terminal 337, the variable resistor 345 of the phase shift network PS, the adjustable arm 375 of the variable resistor VR, the resistors 361 and 363 in series with one terminal of the variable resistor VR, to the conductor 12; thence through the normally open contacts 303 or 323 of the relays R and RI, the armature A, the normally open contact 321 of the relay RS, to the cathode 313. The control circuit of the Electrode Motor M thus has impressed therein a plurality of potentials; an alternating potential derivable from the phase shifter PS, superimposed on a potential tending to maintain the control electrode more positive than the cathode derivable from the secondary SS, a potential tending to maintain the control electrode either more or less positive than the cathode depending on its setting derivable from the resistor VR, and a potential tending to maintain the control electrode more negative than the cathode derivable from the armature A. The phase angle at which the thyratron is rendered conducting is determined by the sum of these potentials. With the Motor Control Circuit closed at contacts 303 or 323 and 321, the potential derivable from the variable resistor VR sets the thyratron T to be fired at a predetermined instant in the half periods of the supply independently of the other components, and the potential derivable from the secondary SS and from the armature A cooperates to vary the motor current automatically, in such manner that at all times the IR drop through the armature A is substantially compensated.

Thus, IR compensation is effected by the transformer ST, the primary current of which is the current flowing through the motor. If this current tends to increase because the load on the motor increases there would be an increase in the potential absorbed by the ohmic resistance of the motor and in the absence of compensation less potential available to drive the motor so that it would run at a lower speed. But in our system, the positive bias impressed through transformer ST increases because of the higher current to compensate for the increased IR drop through the motor by causing the thyratron T to fire earlier and thus make available more driving voltage for the motor so that the motor speed remains substantially unchanged. The inverse occurs when the current drawn by the motor tends to decrease. To maintain the operation stable, the IR drop compensation effect should be so set that an increase in load causes a slight decrease in speed and a decrease in load causes a slight increase in speed.

The Starting Circuit is actuable by the switch 201. This circuit includes the relay RS, a relay RW for closing the supply circuit through the Power Supply Unit and thereby energizing the electrode and work circuit, a water solenoid SW for opening the cooling water valve VW so that water flows through the gun, and a solenoid SG for opening the gas valve VG so that shielding gas may flow through the gun. The water system is provided with a pressure switch WPS which is closed when the water pressure is adequate.

The switch 201 is actuable by the trigger of the gun and is open in the stand-by condition of the apparatus. This switch is adapted to be connected in a circuit extending from the conductor 12, through the pressure switch WPS, a normally closed contact 391 of the inching relay RI, the coil 181 of the relay RW, to the conductor 14. Thus, with the water pressure adequate, the relay RW is energized when the trigger of the welding gun is actuated. The switch 201 is also adapted to be connected in a circuit extending from the conductor 12 through the switch 201, the pressure switch WPS, the coil 393 of the relay RS, to the conductor 14. The relay RS is provided with a normally open contact 395 in addition to the normally closed and normally open contacts mentioned above. This normally open contact 395 is connected in series with the solenoids SG and SW between the conductors 12 and 14.

The Inching Circuit includes an inching switch 231, actuable by a trigger of the Welding Gun, and the relay RI. This relay has, in addition to the normally open contact 323 in the circuit of the armature A and the normally closed contact 391 in circuit with the coil 181, a normally closed contact 401 which may be connected to the armature of the motor (not shown) which drives the work table, if any is included; and a normally open contact 403 in series with the coil 393 of the relay RS. The coil of the relay RI is connected between the conductors 12 and 14 through the switch 231.

A system which we have made and found to operate satisfactorily has the following component parameters. It is to be kept in mind that these parameters have numerous equivalents both as to kind and magnitude known to those skilled in the art, and that our invention is not to be limited in any respect to the component parameters listed.

| | |
|---|---|
| Relay RS | Potter Brumfield MR11A, 110 volt A.-C. |
| Relay RI | Potter Brumfield MR11, 110 volt A.-C. |
| Electrode Motor | Bodine 1/12 horsepower motor. |
| Rectifier RX | Selenium rectifier of the type adequate to supply the field current for the motor. |
| Thyratron T | Westinghouse WL-5684. |
| Transformer AT | Primary turns 1,600; secondary turns 1,700; rating 3VA— Westinghouse Serial No. 1,501,387. |
| Phase shift resistor 343 | 3,000 ohms. |
| Phase shift capacitor 341 | 1 microfarad. |
| Phase shift variable resistor 345 | 50,000 ohms. |
| Rectifier RX2 | Selenium rectifier. |
| Bias capacitor 351 | 1 microfarad. |
| Variable resistor VR | 30,000 ohms |
| Resistors 361 and 363 | 22,000 ohms and 33,000 ohms. |
| Resistors 365, 367, 369 | 22,000 ohms, 15,000 ohms and 47,000 ohms. |
| Transformer ST | Primary two parallel windings 30 turns each, secondary 6000 turns, rating 4VA—Westinghouse Serial No. 1,499,427. |
| Resistor 421 across secondary SS | 2,200 ohms. |
| Rectifier RX1 | Selenium rectifier. |
| Capacitor 331 | 1 microfarad. |
| Variable resistor 335 | 50,000 ohms |
| Grid resistor 381 | 47,000 ohms. |
| Surge suppressor capacitor 423 | .01 microfarad. |
| Braking resistor RB | 3 ohms (2 watts). |

In the standby condition of the apparatus disclosed, the conductors 11, 13 and 15, and 12 and 14 are energized by the closing of the disconnect switches (not shown) for the power supply. If the water pressure is adequate, the switch WPS is closed. The switches 201 and 231 in the gun are open. The relays RW and RS are then deenergized and the polyphase transformer and rectifier, and the conductors 29 and 39 are deenergized. The armature circuit of the Electrode Motor is also open at the normally open contacts 303 and 323 of the relay R and at contact 321 of relay RS. The field circuit F for the motor is closed and the motor is supplied with field current. In addition, the braking resistor is connected across the armature A through the normally closed contact 305 of the relay RS, the solenoids SG and SW are deenergized and the valves VVG and VW are closed.

Since the motor circuit is open, the thyratron T does not carry current and the direct current potential derivable from the secondary SS is zero. The phase shift network PS is energized as is also the biasing network BL. This bias is set so that if the thyratron T is energized, it conducts at an intermediate instant in the positive half periods of the supply.

To carry out a welding operation, the electrode Z is threaded into the Welding Gun, and the work W is positioned on the work table. The inching switch 231 is then closed instantaneously repeatedly to jog the electrode Z and position it properly. The closing of the inching switch 231 closes the circuit through the coil 431 of the relay RI actuating this relay. At the normally closed, now open, contact 401 of this relay the circuit through a table motor, if any, is opened to prevent movement of the table which carries the work. At the now closed contact 323, the circuit of armature A is conditioned to be closed. At the other normally open, now closed, contact 403, a circuit is closed through the coil 393 of the relay RS actuating this relay. At the other normally closed, now open, contact 391, the circuit through the coil 181 of the relay RW is maintained open so that the Power Supply Unit is not energized.

The actuation of the relay RS opens the circuit through the braking resistor RB at contact 305 permitting the armature A to rotate and, in addition, closes the supply circuit through the armature A. The thyratron T now conducts, energizing the motor and causing the welding electrode Z to move. At the inching switch the electrode is moved out until it is properly set. Now the apparatus is ready for a welding operation.

To start the welding, the electrode Z is brought into contact with the work W, and the switch 201 is closed by the trigger in the Welding Gun. This switch is then held closed by the detent mechanism in the gun. The closing of the switch 201 closes the circuit through the coil 181 energizing relay RW which, in turn, energizes the Power Supply Unit so that current flows through the conductors 29 and 39, the electrode Z and the work W and an arc is fired between the electrode Z and the work W. In addition, the relay R is actuated.

The closing of the switch 201 also energizes the relay RS and this relay operates while the Power Supply Unit is being energized. When relay RS is operated, its normally open contacts 321 and 395 are closed. At contact 395, the solenoids SG and SW are energized so that the valves VG and VW are opened, and cooling water and gas are supplied to cool the welding gun and to shield the arc. At the other contact 321, the circuit through the armature A is conditioned to be closed. At the normally closed, now open, contact 305, the braking resistor RB across the armature A is disconnected. By now, the conductors 29 and 39 have been energized, current flows between the electrode Z and the work and the relay R is actuated and contact 303 is closed, so that, the braking circuit having been opened, the Motor Control Circuit is closed and the electrode Z is moved to the work. The Motor Control Circuit is so set as to impart high acceleration to the armature A initially so that the electrode Z is fed at a high speed. Thus, burn-back of the electrode is avoided.

Once the arc is fired, the welding operation may now proceed. The speed of the welding electrode Z may be precisely adjusted during the operation by varying the resistor VR. This the operator can carry out with one of his hands while the other is holding the gun. The adjustment of the resistor VR varies the biasing potential derived from the network BL and this, in turn, varies the instants in the half periods of the supply when the thyratron T is rendered conducting. In this way the magnitude of the current flowing through the armature A is controlled and thus, the speed may be varied during the welding operation, and the rate at which the electrode is deposited may be precisely controlled.

If, during the welding operation, the operator should remove the electrode Z from the work W and break the arc, without opening the switch 201, the relay R would become deenergized, and its normally open contact 303 would open to open the motor circuit. The motor circuit would, however, remain conditioned to operate since the relay RS would remain energized. Under the circumstances, short interruptions in the welding operation would not require restarting of the apparatus. If, after breaking the arc, the operator would again fire the arc by contacting the electrode Z with the work W instantaneously, the relay R would again be energized closing its normally open contact 303 and again energizing the Electrode Motor. In this case, the motor would quickly come up to speed, since its braking circuit is open and the Motor Control Circuit is set to impart high acceleration.

Obstructions caused by kinking of the electrode Z or other related conditions are overcome by the double roller drive, without causing variations in the speed of the motor because of the IR drop compensation.

At the end of the welding operation, the operator opens the switch 201. The opening of the switch 201 causes the relay RS to be deenergized, its normally closed contact 305 to close and its normally open contacts 321 and 395 to open. The relay RS is of such structure that contact 321 opens before 305 closes so that flow of current through the braking resistor RB from the Motor Control Circuit is precluded. But the braking resistor circuit is closed a short time of the order of $\frac{1}{30}$ second before the welding current stops flowing. The supply of gas and water to the Welding Gun is then interrupted and the braking circuit across the armature A is closed. Opening of the switch 201 also deenergizes relay RW which interrupts the supply of power to the conductors 29 and 39, and the normally open contact 303 in the Motor Control Circuit is opened. The braking resistor is of such magnitude that the arc is interrupted and the feeding of the electrode Z is stopped substantially simultaneously so that the electrode is neither burned back nor does it become frozen to the work.

We have thus provided welding apparatus in which the firing and extinction of the arc are so coordinated with the supply of the welding electrode Z as to avoid burning back of the electrode or its freezing to the work. In addition, the apparatus, in accordance with our invention, includes facilities for controlling the supply of the welding electrode precisely and correspondingly controlling the welding current. In addition, the contacts 305 and 321 cooperate to prevent the closing of the Motor Control Circuit through the braking resistor RB and the consequent damaging of the components of the Circuit.

While we have shown and described a certain specific embodiment of our invention, many modifications thereof are possible. Our invention, therefore, is not to be restricted except insofar as is necessitated by the spirit of the prior art.

We claim as our invention:

1. Apparatus for arc welding work with a consumable electrode including a motor for driving said electrode, a motor control circuit connected to said motor, a braking circuit for said motor connected to said motor, said braking circuit being closed in the stand-by condition of said apparatus, a starting switch for said apparatus; said apparatus being characterized by the fact that said motor control circuit is open in the stand-by condition of said apparatus and by means responsive to actuation of said starting switch for first opening said braking circuit and thereafter closing said motor control circuit when starting to weld, said responsive means including means preventing the closing of said motor control circuit through said braking circuit.

2. Apparatus for arc welding work with a consumable electrode including a motor for driving said electrode, a motor control circuit connected to said motor, a braking circuit for said motor connected to said motor, said braking circuit being closed in the stand-by condition of said apparatus, a starting switch for said apparatus; said apparatus being characterized by the fact that said motor control circuit is open in the stand-by condition of said apparatus and by means responsive to actuation of said starting switch for first opening said braking circuit and thereafter closing said motor control circuit when starting to weld, and for first opening said motor control circuit and thereafter closing said braking circuit when stopping the welding.

3. Apparatus for arc welding work with a consumable electrode including a motor for driving said electrode, a motor control circuit connected to said motor, a braking circuit for said motor connected to said motor, said braking circuit being closed in the stand-by condition of said apparatus, a starting switch for said apparatus; said apparatus being characterized by the fact that said motor control circuit is open in the stand-by condition of said apparatus and by means responsive to actuation of said starting switch for first opening said braking circuit and thereafter closing said motor control circuit when starting to weld, said responsive means including means preventing the closing of said motor control circuit through said braking circuit; said motor control circuit, being of the type which once closed is capable of producing high acceleration of the motor so that said electrode is not burned back.

4. Apparatus for arc-welding work with a consumable electrode including power supply means to be connected in a circuit with said welding electrode and work for producing a welding arc between said electrode and work, a motor for driving said electrode, a motor control circuit which is open in the stand-by condition of said apparatus, connected to said motor, a starting switch for said apparatus, connected to said apparatus, means responsive to actuation of said starting switch for energizing said power supply means to energize said electrode-work circuit, and means responsive to said electrode-work circuit when energized for closing said motor circuit; the said apparatus being characterized by a braking circuit for said motor connected to said motor, said circuit being closed in the stand-by condition of said apparatus, and by means responsive to actuation of said starting switch for opening said braking circuit.

5. Apparatus for arc-welding work with a consumable electrode including power supply means to be connected in a circuit with said welding electrode and work for producing a welding arc between said electrode and work, a motor for driving said electrode, a motor control circuit which is open in the stand-by condition of said apparatus, connected to said motor, a starting switch for said apparatus connected to said apparatus, means responsive to actuation of said starting switch for energizing said power supply means to energize said electrode-work circuit, and means responsive to said electrode-work circuit when energized for closing said motor circuit; the said apparatus being characterized by a braking circuit for said motor connected to said motor, said circuit being closed in the stand-by condition of said apparatus, and by means responsive to actuation of said starting switch for opening said braking circuit, and said apparatus being further characterized by that the means for energizing the electrode-work circuit, the means for closing the motor control circuit and the means for opening the braking circuit are so related that when said starting switch is actuated, the braking circuit is opened before the electrode-work circuit is energized or the motor control circuit is closed and the motor control circuit once closed imparts high acceleration to the motor so that burnback of the electrode is prevented.

6. Apparatus for arc welding work with a consumable electrode including power supply means to be connected in a circuit with said welding electrode and work for producing a welding arc between said electrode and work, a motor for driving said electrode, a motor control circuit which is open in the stand-by condition of said apparatus, connected to said motor, a starting switch for said apparatus, said switch having a first position and a second position, said apparatus being quiescent when said switch is in said first position and in operation when said switch is in said second position, means responsive to actuation of said starting switch from said first position to said second position for energizing said power supply means to energize said electrode-work circuit, and means responsive to said electrode-work circuit when energized for closing said motor circuit; the said apparatus being characterized by a braking circuit for said motor connected to said motor, said circuit being closed in the stand-by condition of said apparatus, and by means responsive to said starting switch for opening said braking circuit when said switch is in said first position and for reclosing said braking circuit when said switch is in said second position.

7. Apparatus for arc welding work with a consumable electrode including power supply means to be connected in a circuit with said welding electrode and work for producing a welding arc between said electrode and work, a motor for driving said electrode, a motor control circuit which is open in the stand-by condition of said apparatus, connected to said motor, a starting switch for said apparatus, said switch having a first position and a second position, said apparatus being quiescent when said switch is in said first position and in operation when said switch is in said second position, means responsive to actuation of said starting switch from said first position to said second position for energizing said power supply means to energize said electrode-work circuit, and means responsive to said electrode-work circuit when energized for closing said motor circuit; the said apparatus being characterized by a braking circuit for said motor connected to said motor, said braking circuit including a resistor connected in parallel with said motor and being closed in the stand-by condition of said apparatus, and by means responsive to said starting switch for opening said braking circuit when said switch is in said first position and for reclosing said braking circuit when said switch is in said second position, said resistor being of such magnitude that when said starting switch is reverted from said second position to said first position, said motor is stopped and the electrode-work circuit is de-energized substantially simultaneously so that said electrode neither freezes to said work nor is burned back.

8. Apparatus for arc welding work with a consumable electrode including power supply means to be connected in a circuit with said welding electrode and work for producing a welding arc between said electrode and work, a motor for driving said electrode, a motor control circuit which is open in the stand-by condition of said apparatus, connected to said motor, a starting switch for said apparatus, said switch having a first position and a second position, said apparatus being quiescent when said switch is in said first position and in operation when said switch is in said second position, means responsive to actuation of said starting switch from said first position to said second position for energizing said power supply means to energize said electrode-work circuit, and means responsive to the current flow through, as distinct from the potential across, said electrode-work circuit when energized for closing said motor circuit; the said apparatus being characterized by a braking circuit for said motor connected to said motor, said braking circuit being closed in the stand-by condition of said apparatus, and by means responsive to said starting switch for opening said braking circuit when said switch is in said first position and for reclosing said braking circuit when said switch is in said second position.

9. Apparatus for arc-welding work with a consumable electrode including power supply means to be connected in a circuit with said welding electrode and work for producing a welding arc between said electrode and work, a motor for driving said electrode, a motor control circuit connected to said motor, a starting switch for said apparatus connected to said apparatus, means responsive to actuation of said starting switch for energizing said power supply means to energize said electrode-work circuit, a braking circuit for said motor connected to said motor, said braking circuit being closed in the stand-by condition of said apparatus, and means responsive to actuation of said starting switch for opening said braking circuit, the said apparatus being characterized by a motor control circuit having first and second normally open switch means therein, by means responsive to actuation of said starting switch for closing said first switch means, and by means responsive to energization of the electrode-work circuit for closing said second switch means.

10. Apparatus for arc welding work with a consumable electrode including power supply means to be connected between said electrode and work for producing an arc between said electrode and work, a pair of rollers for engaging said electrode and driving said electrode to said work, a drive motor, mechanical means coupling said motor to said rollers, said coupling means including means for driving both said rollers, and a circuit connected to said motor for energizing said motor, said energizing circuit for said motor including means for compensating for the potential drop absorbed by the resistance of said motor when it is in operation.

11. Apparatus for arc welding work with a consumable electrode comprising a motor for driving said electrode, a normally closed switch means, a braking circuit for said motor connected across said motor including said switch means, said braking circuit being closed by said switch means in the stand-by condition of said apparatus, normally open switch means, an energizing circuit for said motor including said normally open switch means, said energizing circuit being maintained open in the stand-by condition of said apparatus by said normally open switch means, manual switch means, means responsive to actuation of said manual means for closing said normally open switch means, said opening means and said closing means being actuable independently.

12. Apparatus for arc welding work with a consumable electrode comprising a motor for driving said electrode, a normally closed switch means, a braking circuit for said motor connected across said motor including said switch means, said braking circuit being closed by said switch means in the stand-by condition of said apparatus, a welding current supply circuit connected to said electrode and said work, said circuit being currentless in the stand-by condition of said apparatus, normally open switch means, an energizing circuit for said motor including said normally open switch means, said energizing circuit being maintained open in the stand-by condition of said apparatus by said normally open switch means, means responsive to current flow in said welding current supply circuit connected to said normally open switch means, manual switch means, means responsive to actuation of said manual means for opening said normally closed switch means, and means responsive to the actuation of said manual means connected to said welding current supply circuit for causing current to flow in said circuit, said opening means and said closing means being actuable independently.

13. Apparatus for arc welding work with a consumable electrode comprising a motor for driving said electrode, normally closed switch means, a braking circuit for said motor connected across said motor including said switch means, said braking circuit being closed by said switch means in the stand-by condition of said apparatus, a welding current supply circuit connected to said electrode and said work, said circuit being currentless in the stand-by condition of said apparatus, first normally open switch means, second normally open switch means, an energizing circuit for said motor including in series said first and second normally open switch means, said energizing circuit being maintained open in the stand-by condition of said apparatus by said first and second normally open switch means, means responsive to current flow in said welding current supply circuit connected to said second normally open switch means for closing said second normally open switch means, manual switch means, means responsive to actuation of said manual means for opening said normally closed switch means, and closing said first normally open means, and means responsive to actuation of said manual means connected to said welding current supply circuit for causing current to flow in said circuit, said opening and closing means and said closing means being actuable independently.

References Cited in the file of this patent
UNITED STATES PATENTS

| | | |
|---|---|---|
| 1,287,774 | Sessions | Dec. 17, 1918 |
| 1,502,489 | Steenstrup | July 22, 1924 |
| 1,508,738 | Whiting | Sept. 16, 1924 |
| 1,535,883 | Winne | Apr. 28, 1925 |
| 1,809,625 | Griggs | June 9, 1931 |
| 1,944,756 | Quarles | Jan. 23, 1934 |
| 2,080,496 | Howe | June 1, 1937 |
| 2,101,802 | Winograd | Dec. 7, 1937 |
| 2,145,010 | Kennedy et al. | Jan. 24, 1939 |
| 2,175,547 | Journeaux | Oct. 10, 1939 |
| 2,179,569 | Young | Nov. 14, 1939 |
| 2,223,177 | Jones | Nov. 26, 1940 |
| 2,264,333 | Satterlee | Dec. 2, 1941 |
| 2,282,522 | Kratz | May 12, 1942 |
| 2,312,117 | Moyer | Feb. 23, 1943 |
| 2,322,218 | Baird | June 22, 1943 |
| 2,331,123 | Leigh | Oct. 5, 1943 |
| 2,421,632 | Livingston | June 3, 1947 |
| 2,445,789 | Lobosco | July 27, 1948 |
| 2,552,206 | Moyer | May 8, 1951 |
| 2,635,165 | Spice et al. | Apr. 14, 1953 |
| 2,636,102 | Lobosco | Apr. 21, 1953 |